United States Patent [19]

Killop

[11] 4,208,773

[45] Jun. 24, 1980

[54] BURNISHING RACK

[75] Inventor: James T. Killop, Warren, Mich.

[73] Assignee: Anderson-Cook, Inc., Fraser, Mich.

[21] Appl. No.: 27,625

[22] Filed: Apr. 6, 1979

[51] Int. Cl.² .................... B21C 37/30; B21D 17/04
[52] U.S. Cl. ........................................ 29/90 B; 72/88
[58] Field of Search ............... 29/90 R, 90 B, 159.2;
72/88, 90

[56] References Cited

U.S. PATENT DOCUMENTS 4,080,699    3/1978    Anderson ........................... 29/90 B Primary Examiner—Harrison L. Hinson
Attorney, Agent, or Firm—Reising, Ethington, Barnard, Perry & Brooks

[57] ABSTRACT

A rack (12, 14) for burnishing toothed gears (16) is disclosed as having an elongated body of a multiple section construction that provides accentuated axial crowns to gear teeth burnished by the rack. Leading and trailing sections (36, 38) of the rack each have a tooth forming face (44) that provides the rotary support for the gear and the burnishing of the gear teeth (46) as the gear rotates between a cooperative pair of the racks. One of the toothed forming faces, preferably the trailing one, is slightly inclined with respect to the other rack section in a lateral direction along the elongated length of the body so as to provide the accentuated axial crowns on the burnished gear teeth. Both the leading and trailing rack sections are preferably mounted on a base (42) that interconnects the rack sections. One preferred embodiment has a unitary trailing rack section whose toothed forming face is inclined in a single direction, while another preferred embodiment has a trailing rack section of a two-piece construction with the toothed forming face thereof having a shallow V shape.

10 Claims, 9 Drawing Figures

BURNISHING RACK

TECHNICAL FIELD

This invention relates generally to burnishing of toothed gears and, more particularly, to an elongated rack for providing burnishing of gear teeth.

BACKGROUND ART

Most conventional gear burnishing machines include toothed rotary tools supported in a spaced relationship to each other to receive a toothed gear that is rotatably supported on a work spindle about an axis parallel to the axes about which the tools rotate. Driving of one or more of the tools meshes the tool teeth with the gear teeth so that pressure applied therebetween causes the harder teeth of the tools to remove surface defects from the softer gear teeth. Removal of the surface defects on the burnished gears lengthens their useful life and also mitigates gear noise during use.

In order to have high production capacity, burnishing machines must include suitable mechanisms for loading and unloading the gears. The work spindles that rotatably support the gears during the burnishing are conventionally supported for movement so as to perform the loading and unloading of the gears. Automatic conveyors have also been utilized to feed gear burnishing machines and receive burnished gears therefrom after being processed by the machines.

The United States Patent of Anderson No. 4,080,699, which is assigned to the assignee of the present invention and the entire disclosure of which is hereby incorporated by reference, discloses apparatus and a method for burnishing gears incorporating a pair of spaced gear racks having opposed forming faces for meshing with a toothed gear to be burnished during driven rack movement so that the meshing of the rack and gear teeth provides the sole support for the gear as the rack teeth concomitantly burnish the gear teeth. Very good results are achieved in performing the burnishing operation by virtue of the manner in which the rack teeth mesh with the gear teeth to provide the burnishing thereof and the rotational support for the gear being burnished. It is believed that the superior results are achieved due to the freedom of the axis of gear rotation to move with respect to the racks as the rack teeth engage defects on the gear teeth.

When gear teeth are burnished by either a rotary or rack burnishing operation like those described above, the natural flow of the metal gear teeth provides the opposite faces of each tooth with a slight crown intermediate the axial ends of the gear. Thus, at any selected radial position from the axis of gear rotation through the tooth, a straight line between the opposite axial ends of either tooth face will be located inwardly from the axial intermediate portion of that face by a certain distance which is normally on the order of one to four ten-thousandths of an inch. Such axial crowns on gear tooth faces provide meshing engagement of the gear teeth at the axial intermediate portions of the teeth where the greatest strength resides and thus enhance gear performance and durability.

DISCLOSURE OF INVENTION

An object of the present invention is to provide an elongated burnishing rack that is capable of burnishing toothed gears so that each burnished gear tooth has accentuated axial crowns intermediate the axial ends of the tooth. Gear teeth burnished by the rack of the present invention have axial crowns in the range of about four to seven ten-thousandths of an inch or greater in order to enhance gear performance and durability while doing so without excessively increasing the cost of the gear.

In carrying out the above object and other objects of the invention, the burnishing rack has an elongated body including a first leading rack section and a second trailing rack section each of which has a toothed forming face for meshing with the teeth of a gear to provide the rotary support thereof and concomitant burnishing of the gear teeth. One of the toothed forming faces, preferably the one on the trailing rack section, is slightly inclined with respect to the toothed forming face of the other rack section in a lateral direction along the elongated length of the body so as to provide each burnished gear tooth with accentuated axial crowns intermediate the axial ends of the tooth. The inclination of the toothed forming face on the trailing rack section with respect to the tooth forming face on the leading rack section does not have to be particularly great in order to provide the accentuated axial crowns, i.e. an inclination of $2\frac{1}{2}$ degrees is sufficient so that each side of the tooth has an axial crown in the range of about four to seven ten-thousandths of an inch. Also, accentuated axial crowns can be provided on helical gear teeth as well as straight gear teeth by burnishing racks constructed in accordance with the invention.

During use, a pair of the burnishing racks according to the invention are mounted for reciprocal movement in opposite directions with their toothed forming faces opposing each other so that cooperation between the two racks provides the rotational support for the gear whose teeth are burnished by the meshing that provides such support. The sections of each rack are mounted on a base which in turn is mounted on upper and lower bases of a machine that is capable of reciprocally driving the racks to provide the burnishing. Preferably, the rack base has an elongated shape of a uniform thickness and a grinding operation is performed on the sections of the rack to provide the inclination of the toothed forming face on the trailing rack section.

Two preferred embodiments of the burnishing rack are each disclosed as including a unitary leading rack section having a mounting surface that engages the base of the rack and is parallel to the toothed forming face at which the burnishing is performed. The trailing rack section of one embodiment is also of a unitary construction and has a mounting surface that is inclined with respect to its toothed forming face in a lateral direction along the length thereof so as to provide the inclination of its toothed forming face relative to the toothed forming face on the leading rack section. The other preferred embodiment has a trailing rack section of a two-piece construction including symmetrical portions at each of its lateral sides. Each lateral portion of the two-piece trailing rack section has a mounting surface that is laterally inclined with respect to the toothed forming face thereof in an opposite direction to the other associated lateral portion of the trailing rack section. The inclination of the trailing rack section portions is such that the toothed forming face of the two-piece trailing rack section has a V shape between its opposite lateral sides.

An associated pair of the racks having the unitary trailing rack section for performing burnishing are identical to each other except that the inclination on the toothed forming faces of their trailing rack sections are in opposite directions to each other. An associated pair of the racks with the two-piece trailing rack section are completely identical to each other.

The objects, features, and advantages of the present invention are readily apparent from the following detailed description of the best modes for carrying out the invention when taken in connection with the accompanying drawings.

BEST MODES FOR PRACTICING THE INVENTION

Figure 1:
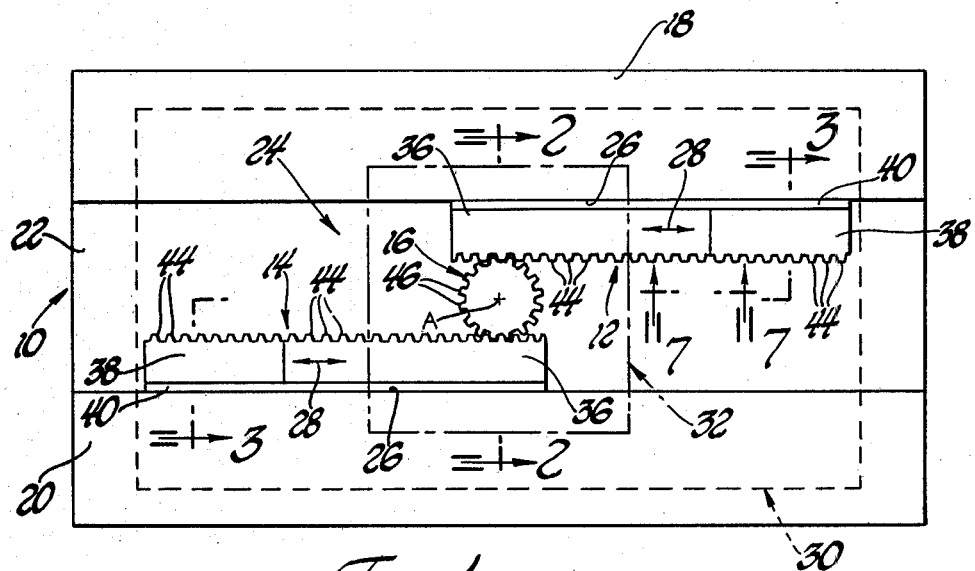
FIG. 1 is a front elevation view of a machine that includes an associated pair of burnishing racks that are each constructed in accordance with the present invention.

Referring to FIG. 1 of the drawings, a gear burnishing machine indicated collectively by 10 utilizes a pair of upper and lower burnishing racks 12 and 14 that are each constructed in accordance with the present invention to cooperatively provide burnishing of a toothed gear 16 as will be hereinafter described in greater detail. Upper and lower bases 18 and 20 of the machine 10 are interconnected by a vertically extending connecting portion 22 such that the bases define a work space 24 in which the burnishing takes place. Conventional slideways 26 on the upper and lower bases respectively mount the upper and lower burnishing racks 12 and 14 for driven movement in the opposite directions shown by arrows 28 under the driving action of a schematically indicated drive mechanism 30. One type of drive mechanism which may be utilized with the burnishing machine is disclosed by the United States Patent of Anderson No. 3,793,866, which is assigned to the assignee of the present of the present invention.

A schematically indicated loader 32 shown in FIG. 1 is used to initially load a gear 16 to be burnished. During loading, the upper rack 12 is positioned sufficiently to the right so that its left end is to the right of the right end on the lower rack 14. Gear 12 is positioned upon loading so that it meshes with the lower rack 14. As the driving initially proceeds, after loading, the upper and lower racks 12 and 14 are respectively moved to the left and the right in opposite directions to each other and both racks mesh with the gear 16 as shown such that the meshing of rack and gear teeth provides the sole rotary support for the gear about the axis A while the harder rack teeth burnish the softer gear teeth as initially disclosed in the aforementioned patent of Anderson No. 4,080,699. After the upper and lower racks 12 and 14 have moved sufficiently far to the left and the right, respectively, so that their right and left ends are positioned adjacent each other and have fully meshed with the gear 16, the drive mechanism 30 moves the racks in the opposite direction back to their original positions and the loader 32 then unloads the burnished gear 16.

Figure 2:
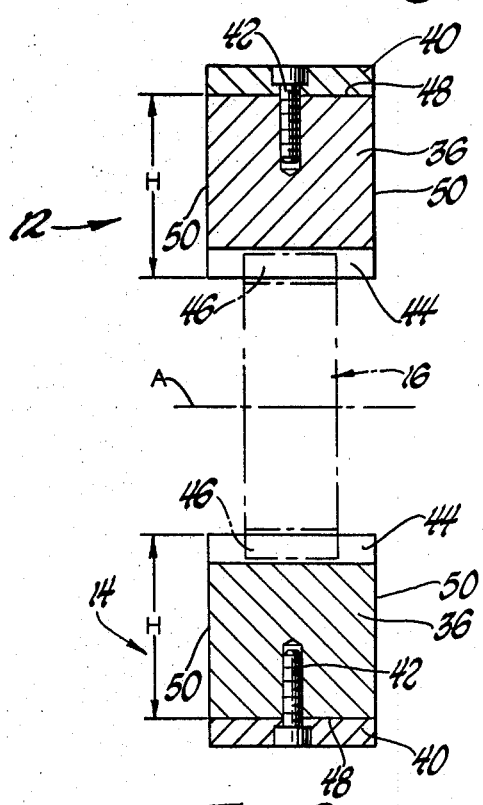
FIG. 2 is an elevation view taken in section along line 2—2 of FIG. 1 and illustrates leading sections of the burnishing racks.
Figure 3:
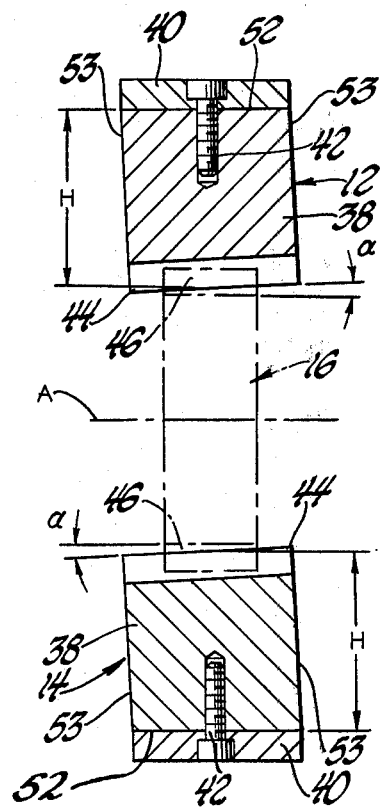
FIG. 3 is an elevation view taken in section along line 3—3 of FIG. 1 and illustrates trailing sections of the burnishing racks.

With combined reference to FIGS. 1, 2, and 3, each of the upper and lower racks 12 and 14 has an elongated metallic body of a suitable tool steel and includes a first leading rack section 36 and a second trailing rack section 38 that are preferably mounted on an associated base 40 in a removable manner such as by the bolts 42. Each of the rack sections 36 and 38 has teeth 44 that define a toothed forming face for meshing with the teeth 46 of the gear 16 to provide the rotary support for the gear while at the same time providing the burnishing of the gear teeth in the manner previously described. As seen in FIG. 2, each of the leading rack sections 36 has a unitary construction and includes a mounting surface 48 that engages the base 40 upon mounting and securement by the bolts 42. The teeth 44 of the leading rack sections 36 extend parallel to the base mountng surface 48 so that the toothed mounting surface defined thereby is oriented parallel to the slideway 26 on which the rack is mounted and parallel to the axis A about which the gear 16 rotates. Sidewalls 50 of the leading rack sections 36 extend in a parallel relationship to each other between the mounting surface 48 and the associated toothed forming face perpendicular thereto and to the axis A about which the gear 16 rotates. It should be noted that the base 40 has an elongated shape of a plate-like construction with a uniform thickness. The rectangular cross sections of the leading rack sections 36 and the bases 40 thus cooperatively provide the parallel relationship between the toothed forming faces on these rack sections and the axis A of gear rotation. Also, between the mounting surface 48 of each leading rack section 36 and the tips of the teeth 44 defining the associated toothed forming face, the leading rack sections have a height H of an appropriate value to provide proper meshing with the teeth 46 of the gear 16.

With particular reference to FIG. 3, each of the trailing rack sections 38 has a unitary construction and includes a mounting surface 52 that engages the rack base 40 in the mounted relationship shown similar to the mounting of the leading rack sections 36 previously described. Side walls 53 of each trailing rack section 38 extend in a parallel relationship to each other between the mounting surface 52 and the toothed forming face defined by its teeth 44 in a perpendicular relationship to the toothed forming face. However, the mounting surfaces 52 of each of the trailing rack sections 38 are inclined in a lateral direction along the elongated length of the rack body with respect to the toothed forming face provided by the associated teeth 44. The amount of this inclination is exaggerated for illustrative purposes only and does not have to be particularly great, i.e. the angle a defined by the tips of the teeth 44 with respect to the base mounting surfaces 52 and the axis A of gear rotation is only on the order of about 2½ degrees. The inclination of the toothed forming face on each rack section is the same as the inclination on the other one but in an opposite direction so that the two faces are parallel to each other while slightly inclined with respect to the axis A about which the gear 16 rotates. As the burnishing operation takes place along the trailing rack sections 38, the rack teeth 44 provide a somewhat greater pressure on the axial ends of the gear teeth 46 so as to provide accentuated axial crowns intermediate the axial ends of the teeth. At the lateral midpoint between its side walls 53, trailing rack section 38 has a height H between its mounting surface 52 and tooth tips equal to the corresponding height H on the leading rack section so as to provide the proper spacing between the rack sections for burnishing the gear teeth.

Figure 4:
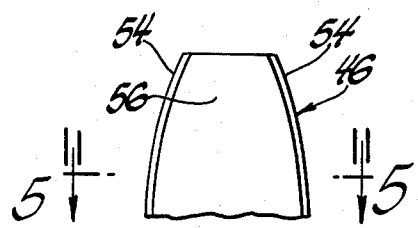
FIG. 4 is an end view illustrating a gear tooth that has been burnished by a pair of associated racks constructed in accordance with the invention.
Figure 5:
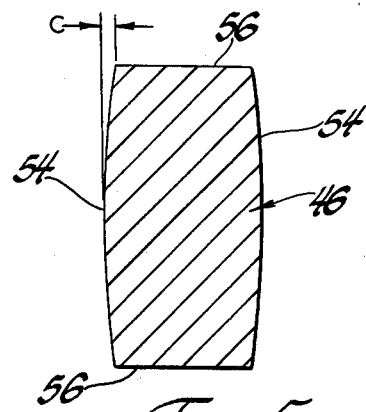
FIG. 5 is a sectional view of the burnished gear tooth taken along line 5—5 of FIG. 4 to illustrate the accentuated axial crowns on the opposite sides of the tooth.

As seen by reference to FIGS. 4 and 5, each burnished gear tooth 46 has opposite sides 54 that extend between axial tooth ends 56 with smoothly curved shapes that are referred to in the gear art as crowns. The extent of the crown is defined by the dimension C shown in FIG. 5. This dimension C is determined by the spacing between a first straight line through the junctions of the axial tooth ends 56 with one side 54 of the gear tooth and a second line that is parallel to the first line and just touches the center of the gear tooth surface midway between the axial ends 56. Normally the extent of the crown on any burnished tooth is on the order of about one to four ten-thousandths of an inch. Crowned gear teeth are desirable in that the crown shape provides meshing of the gear teeth intermediate the axial ends thereof where the greatest strength resides. With the multiple section rack construction having the inclined sections described, it is possible to achieve accentuated crowns that are on the order of about four to seven ten-thousandths of an inch or greater without appreciably increasing the cost of the burnished gear. Such accentuated crowns further enhance the gear operation and gear tooth strength by insuring meshing of the gear tooth with the axial intermediate portion thereof where the crown is the greatest. Of course, the extent of the crowns are exaggerated in the drawings from their actual shapes to illustrate the tooth construction involved.

In manufacturing the multiple section rack disclosed by FIGS. 2 and 3, one preferred method of making the racks is to begin with bar stock of the appropriate cross section and lengths for defining the leading and trailing rack sections. It should be noted that best results are achieved if the leading rack section 36 is approximately twice as long as the trailing rack section 38 having the inclination. After first grinding the teeth 44 into both of the bar sections, the bar section that is to provide the trailing section 38 has its base surface 52 ground so as to be laterally inclined with respect to the teeth 44. This necessarily means that one of the side walls 53 of the trailing rack section 38 has a height slightly greater by a predetermined dimension than its middle height H, while the other side wall 53 of the trailing rack section has a height which is slightly less by the same dimension than the middle height H. Thus, to maintain the rack dimensions previously discussed in connection with both FIGS. 2 and 3, it is necessary for the leading rack section 36 to also be ground at its mounting surface 44 but in a parallel relationship to the teeth 48 so that it has the height H that is equal to the middle height H of the trailing rack section 38. This method of making the racks facilitates the initial grinding of the teeth 44 on both sections from bar stock of only one size. Regrinding of the teeth 44 on both the leading and trailing rack sections can be accomplished with a suitable jig that has surfaces inclined with respect to each other so that the teeth 44 of both sections are parallel to each other as the regrinding is performed.

Figure 7:
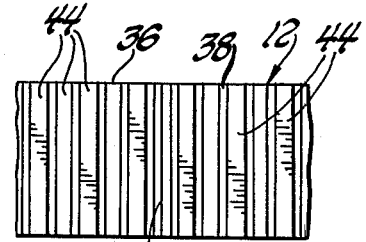
FIG. 7 is a plan view taken along line 7—7 of FIG. 1 at the junction of the leading and trailing rack sections and shows the perpendicular teeth of the forming face thereof which are utilized to burnish straight gear teeth.
Figure 8:
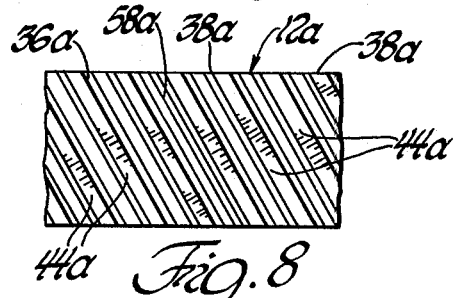
FIG. 8 is a plan view taken in a similar direction to FIG. 7 at an angled junction of the leading and trailing rack sections which each have angled teeth for burnishing a helically toothed gear.
Figure 9:
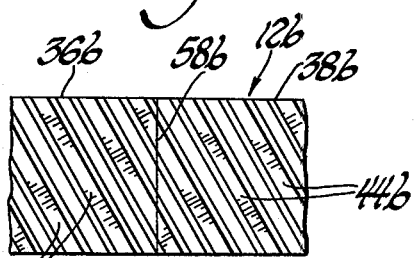
FIG. 9 is a view similar to FIG. 8 illustrating the burnishing rack with angled teeth for burnishing a helically toothed gear but with a perpendicular junction between the leading and trailing rack sections.

As seen in FIG. 7, the leading and trailing rack sections 36 and 38, respectively, have an interface 58 that is parallel to the lateral direction in which the teeth 44 extend perpendicular to the elongated length of the rack to provide burnishing of straight gear teeth such as illustrated by FIGS. 4 and 5. However, it should be understood that the invention is also applicable to burnishing gears having helical teeth. FIGS. 8 and 9 illustrate two different rack embodiments 12a and 12b for burnishing helical gear teeth. Rack 12a shown in FIG. 8 has a leading section 36a and a trailing section 38a that each have teeth 44a extending in an angled direction with respect to the elongated length of the rack so as to provide a proper meshing with a gear having helical gear teeth. The trailing rack section 38a has the same inclination previously described in connection with the embodiment of FIGS. 2 and 3 in order to provide the accentuated crowns intermediate the axial ends of the helical teeth. The interface 58a of the rack 12a extends in an angled direction parallel to the teeth 44a when viewed in the plan direction shown. Rack 12b shown in FIG. 9 also has its leading and trailing sections 36b and 38b, respectively, provided with angled teeth 44b for burnishing helical gear teeth and likewise has its trailing rack section 38b provided with the inclination that provides accentuated axial crowns in the manner previously described. However, the interface 58b of the leading and trailing rack sections 36b and 38b is perpendicular to the elongated length of the rack as opposed to parallel with the direction in which the teeth extend as described in connection with the embodiment of FIG. 8.

Figure 6:
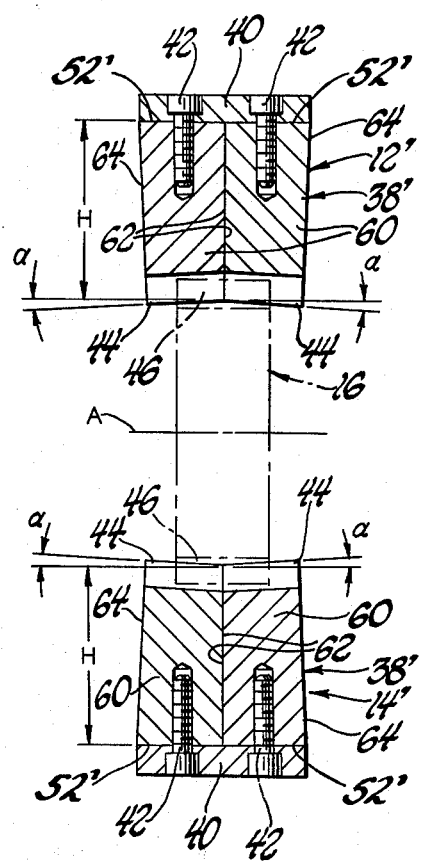
FIG. 6 is a sectional view that illustrates another embodiment of the burnishing racks and is taken in a direction similar to FIG. 3 through the trailing rack sections thereof.

FIG. 6 discloses an alternate embodiment of the upper and lower racks which are indicated by numerals 12' and 14'. The leading rack sections of these alternate rack embodiments are the same as the leading rack sections 36 of the embodiment illustrated in FIG. 2 and, as such, are not illustrated in the drawings. However, the trailing rack sections 38' each have a two-piece construction including symmetrical portions 60 on each lateral side thereof rather than the unitary trailing rack section construction previously described. Each portion 60 of the trailing rack section 38' has a mounting surface 52' that is secured in engagement with the base 40 by associated bolts 42. Mounting surfaces 52' are inclined in a lateral direction along the elongated axis of the rack with respect to the associated teeth 44 thereof by an angle a on the order of 2½ degrees or so. Teeth 44 on the two lateral rack section portions 60 define a shallow V shape so that the two cooperative racks 12' and 14' work on the axial ends of the gear teeth 46 to provide accentuated axial crowns in the same manner previously described. In this connection, it should be noted that the lateral rack section portions 60 have inner surfaces 62 that engage each other and have a height from the mounting surfaces 52' thereof equal to the dimension H that is the same as the height H of the associated leading rack sections as previously described in connection with FIG. 2. Thus, the outer side walls 64 of each of the rack section portions 60 have a somewhat greater height than their inner surfaces 62.

The laterally spaced rack portions 60 of the FIG. 6 embodiment are preferably provided with their inclination by grinding the mounting surfaces 52' and the inner surfaces 62 thereof after first grinding the teeth 44. Such a procedure allows the rack to be ground from bar stock of one size while still allowing all of the teeth 44 on both the leading and trailing sections to be ground in a parallel relationship to each other. Subsequent grinding of the surfaces 52' and 62 with the inclination discussed then provides the rack construction which will permit the accentuated crown to be provided upon burnishing of a gear. Also, it should be noted that the leading rack section for use with the trailing rack section 38' shown in FIG. 6 must have its mounting surface ground in a parallel relationship to its teeth in the same manner previously described in connection with the embodiment of FIGS. 2 and 3 so as to insure the proper height relationship between the different sections. Likewise, either straight teeth as shown in FIG. 7 or angled teeth with either an angled junction or a perpendicular junction as shown in FIGS. 8 and 9 can also be used with the embodiment of FIG. 6 as well as with the previously described embodiment.

While the best modes for practicing this invention have herein been described in detail, those familiar with this art will recognize various alternative designs and embodiments for practicing the present invention as defined by the following claims.

What is claimed is:

1. A rack for burnishing toothed gears comprising an elongated body including first and second rack sections; each of said rack sections having a toothed forming face for meshing with the teeth of a gear such that the meshing burnishes the gear teeth and provides the rotary support for the gear as the burnishing takes place; and the toothed forming face of one of the rack sections being slightly inclined with respect to the toothed forming face of the other rack section in a lateral direction along the elongated length of the body so as to provide each burnished gear tooth with accentuated axial crowns intermediate the axial ends of the tooth.

2. A rack for burnishing toothed gears comprising an elongated body including leading and trailing rack sections; each of said rack sections having a toothed forming face for meshing with the teeth of a gear such that the meshing burnishes the gear teeth and provides the rotary support for the gear as the burnishing takes place; and said toothed forming face of the trailing rack section being slightly inclined with respect to the toothed forming face of the leading rack section in a lateral direction along the elongated length of the body so as to provide each burnished gear tooth with accentuated axial crowns intermediate the axial ends of the tooth.

3. A rack as in claim 2 wherein the teeth of the rack extend laterally in an oblique relationship to the elongated length of the rack.

4. A rack as in claim 2 wherein the teeth of the rack extend laterally in a perpendicular relationship to the elongated length of the rack.

5. A rack as in claim 2 further including a base on which said leading and trailing rack sections are mounted.

6. A rack as in claim 5 wherein the base has an elongated shape of a uniform thickness, each of the rack sections being unitary and having a mounting surface that engages the base upon mounting thereon, the mounting surface of the leading rack section being parallel to the toothed forming face thereof, and the mounting surface of the trailing rack section being inclined with respect to the toothed forming face thereof in a lateral direction along the length thereof so as to provide the inclination of the toothed forming face on the trailing rack section relative to the toothed forming face on the leading rack section.

7. A rack as in claim 5 wherein the base has an elongated shape of a uniform thickness, the leading rack section being of a unitary construction and having a mounting surface that is parallel to the toothed forming face thereof and which engages the base upon mounting thereon, the trailing rack section being of a two-piece construction including symmetrical portions at each lateral side thereof, and each portion of said trailing rack section having a mounting surface that is laterally inclined with respect to the toothed forming face thereof in an opposite direction to the other portion of the trailing rack section.

8. A rack as in claim 7 wherein each portion of the trailing rack section has an inner surface that engages the inner surface on the other portion of the trailing rack section upon mounting on the base.

9. A rack for burnishing toothed gears comprising: an elongated base of a uniform thickness; an elongated body including leading and trailing rack sections; each of said rack sections being of a unitary construction and having a mounting surface for engaging the base upon mounting thereon; each rack section also having a toothed forming face for meshing with the teeth of a gear such that the meshing burnishes the gear teeth and provides the rotary support of the gear as the burnishing takes place; the toothed forming face of the leading rack section being parallel to the mounting surface thereof; the toothed forming face of the trailing rack section being slightly inclined with respect to the mounting surface thereof in a lateral direction along the elongated length thereof; and means for securing the leading and trailing rack sections to the base with the mounting surfaces thereof engaged with the base such that the toothed forming face of the trailing rack section is inclined with respect to the toothed forming face of the leading rack section in a lateral direction along the elongated length of the body so as to provide each burnished gear tooth with accentuated axial crowns intermediate axial ends of the tooth.

10. A rack for burnishing toothed gears comprising: an elongated base of a uniform thickness; an elongated body including leading and trailing rack sections; each of said rack sections having a mounting surface that engages the base upon mounting on the base; each rack section also having a toothed forming face for meshing with the teeth of a gear such that the meshing provides the rotary support of the gear as the burnishing takes place; the leading rack section having a unitary construction with the mounting surface and toothed forming face thereof in a parallel relationship to each other; the trailing rack section being of a two-piece construction including symmetrical portions at each lateral side thereof; each portion of said trailing rack section having a mounting surface that is laterally inclined with respect to the toothed forming face thereof in an opposite direction to the other portion of the trailing rack section; and means for securing the leading and trailing rack sections to the base with the mounting surfaces thereof engaged with the base such that the toothed forming faces on the portions of the trailing rack section form a V-shape that provides each burnished gear tooth with accentuated axial crowns intermediate the axial ends of the tooth.

* * * * *